July 14, 1953 T. R. SMITH 2,645,107
COMBINED WASHING MACHINE AND CENTRIFUGAL EXTRACTOR
Filed Dec. 20, 1948 7 Sheets-Sheet 2

INVENTOR.
Thomas R. Smith,
BY

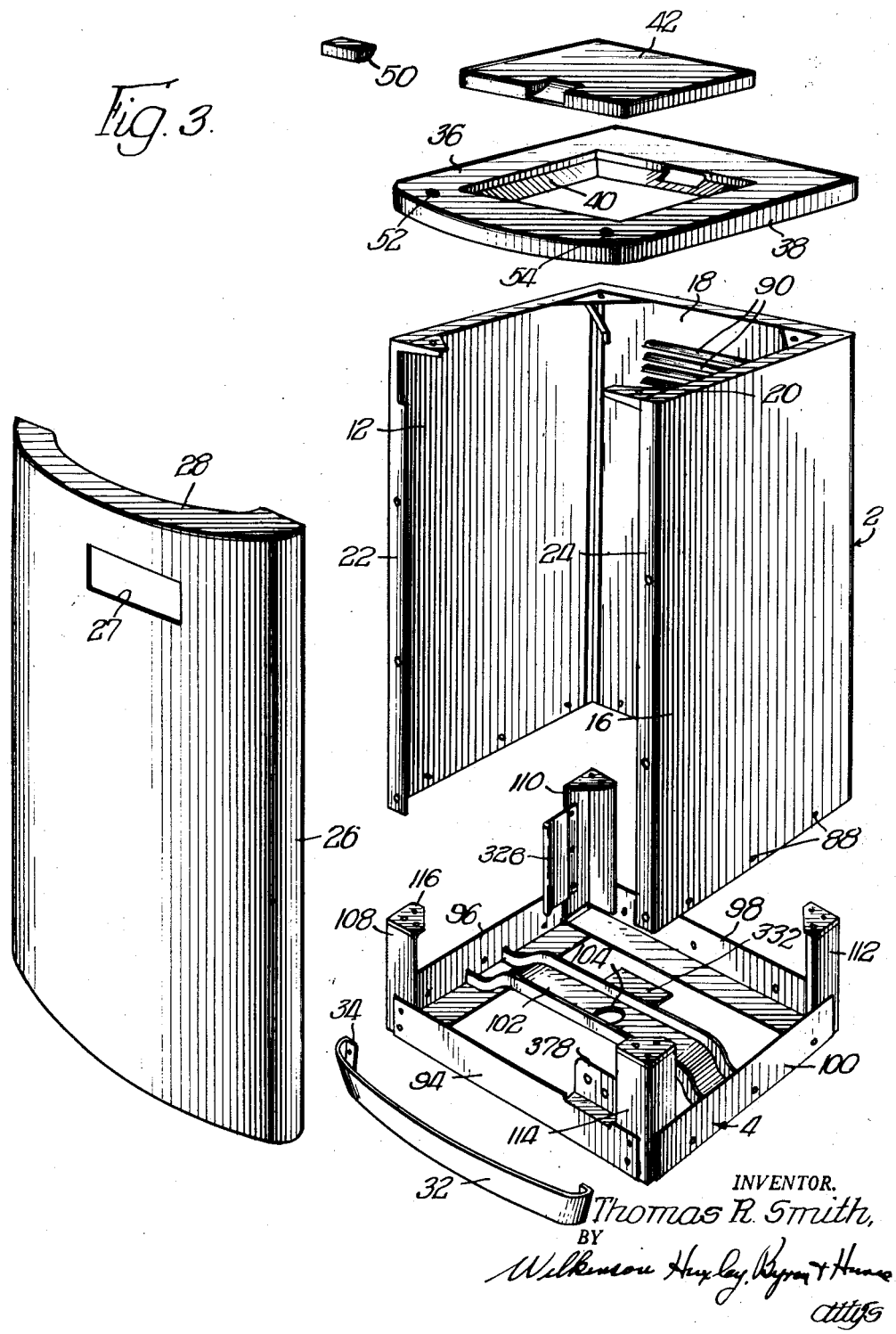

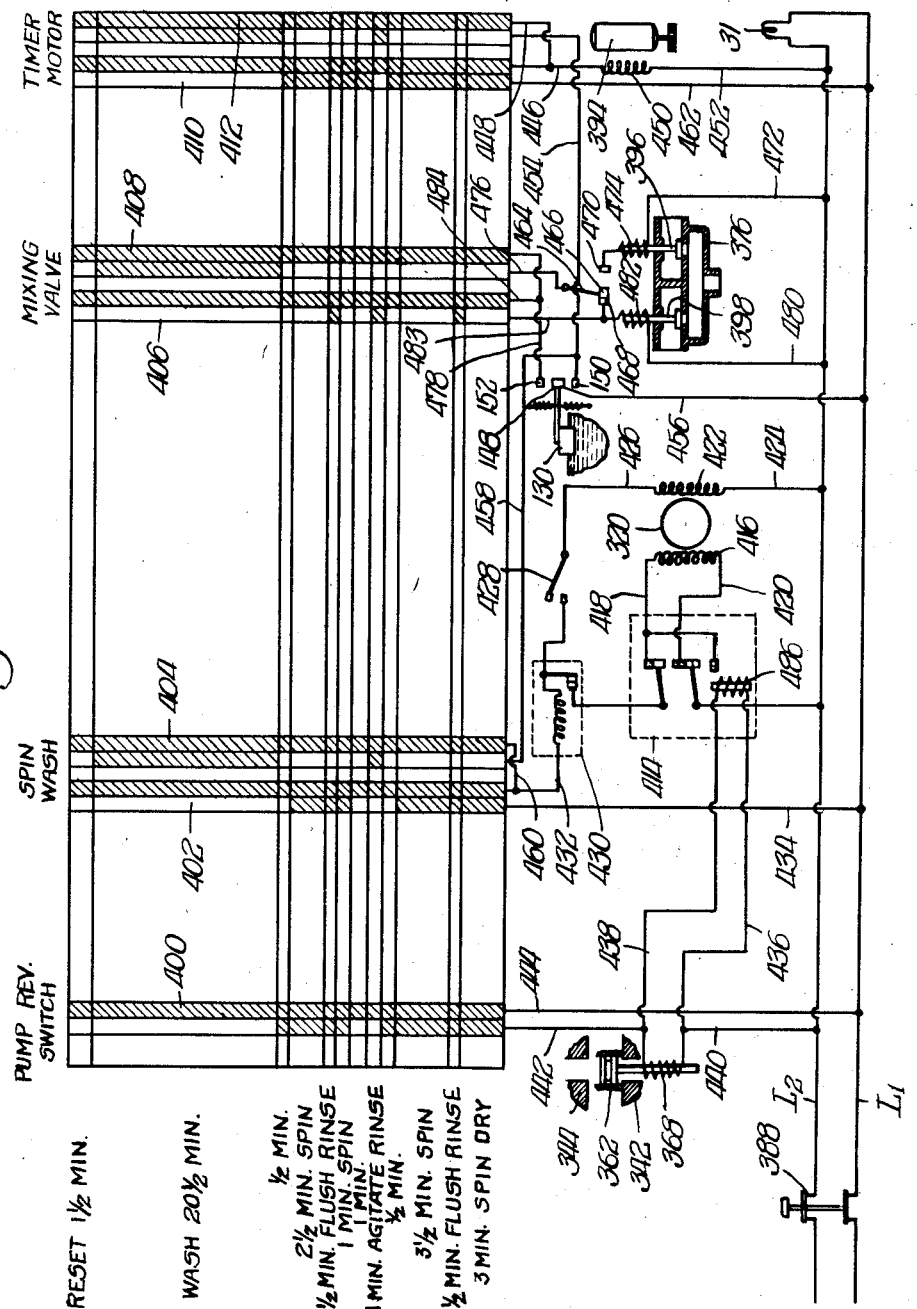

July 14, 1953 T. R. SMITH 2,645,107
COMBINED WASHING MACHINE AND CENTRIFUGAL EXTRACTOR
Filed Dec. 20, 1948 7 Sheets-Sheet 5
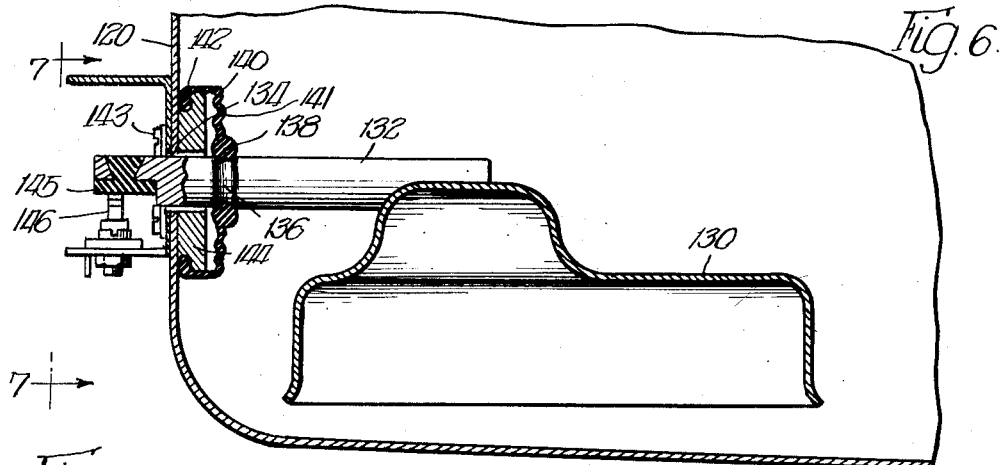
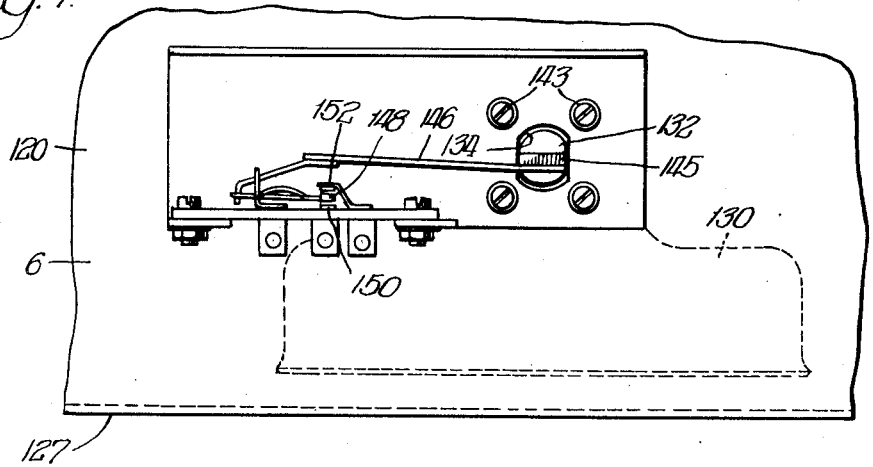
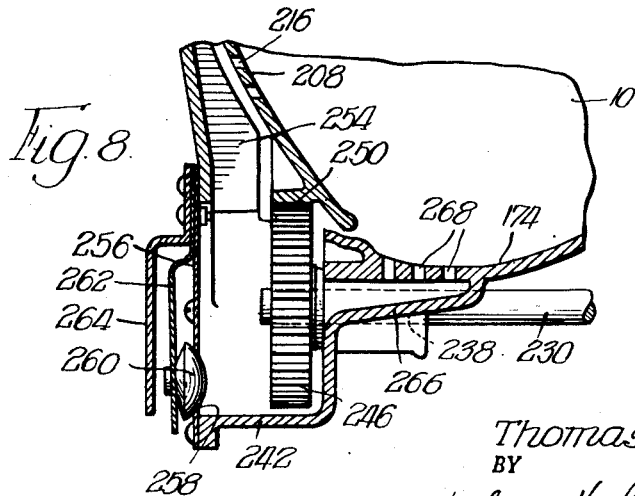
INVENTOR.
Thomas R Smith,
BY

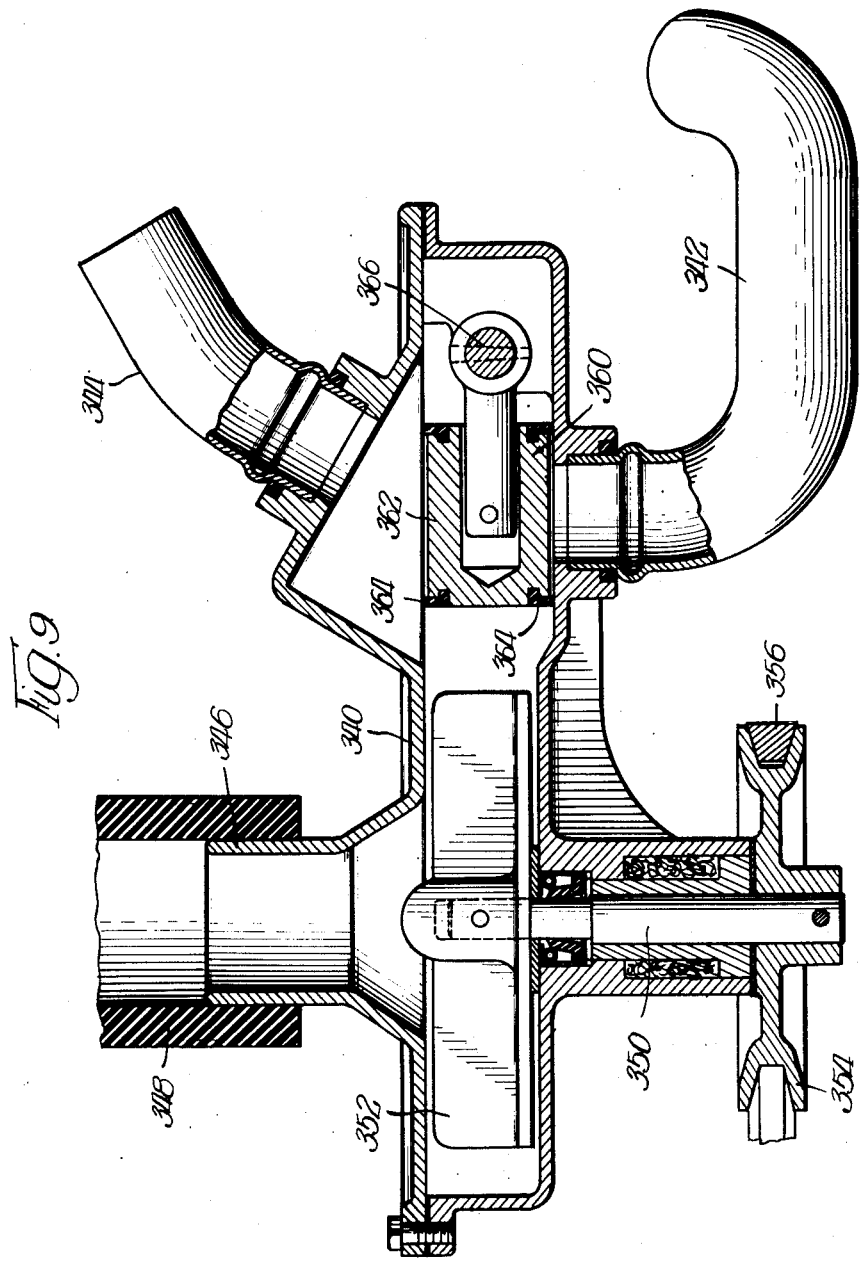

July 14, 1953 T. R. SMITH 2,645,107
COMBINED WASHING MACHINE AND CENTRIFUGAL EXTRACTOR
Filed Dec. 20, 1948 7 Sheets-Sheet 7

INVENTOR.
Thomas R. Smith,
BY
Wilkinson, Huxley, Byron & Hume
Attys.

Patented July 14, 1953

2,645,107

UNITED STATES PATENT OFFICE 2,645,107

COMBINED WASHING MACHINE AND
CENTRIFUGAL EXTRACTOR

Thomas R. Smith, Newton, Iowa, assignor to The
Maytag Company, Newton, Iowa, a corporation
of Delaware Application December 20, 1948, Serial No. 66,229

29 Claims. (Cl. 68—23)

The present invention relates to washing machines, and more particularly to washing machines of the type in which a washing operation is accomplished by agitating the liquid and material contained therein and in which the tub is thereafter rotated to extract the liquid from the material to effect a partial drying thereof. This application is a companion to my copending application Serial No. 66,230, filed of even date herewith, for Combined Washing Machine and Centrifugal Fluid Extractor.

Among the objects of the present invention is to provide a washing machine of the type specified in which the washing cycle, including the washing of the material, the rinsing thereof, and the extracting of liquid therefrom is automatically controlled.

Another object of the invention is to provide a washing machine which is relatively simple in construction with relatively few moving parts, and in which the rotating tub assembly is supported for operation by a single bearing, thus providing a device which is readily and easily maintained in operating condition at a relatively low cost.

A still further object of the present invention is to provide a washing machine of the type herein contemplated in which means is provided to dampen out and control eccentric loadings in the rotating tub, whereby vibrations and other deteriorating forces which would otherwise normally be set up in such an assembly are reduced to a minimum.

The present invention comprehends the provision of agitating means operable about a horizontal axis within the inner tub with novel driving means therefor, the assembly being further characterized by the incorporation therein of means for easy removal of dirt and the like from the bottom of the inner tub which operate to simultaneously remove dirt and the like from said driving means to maintain the same in operative condition over extended periods of time.

Another object within the purview of the present invention is to provide novel means for controlling the driving relation between the motor for the washing machine and the rotating tub assembly, whereby the motor is protected against overloading during the spinning or extracting operation.

A further desideratum of the invention is to provide a novel cabinet and base structure whereby access to the operating mechanisms is readily obtained for adjustment, repair or replacement of parts.

The invention is further characterized in the provision of a novel float controlled switch assembly wherein the sealing means for the actuator therefor serves in the capacity of a support for the said actuator.

Other objects, features, capabilities and advantages are comprehended by the invention, as will later appear and as are inherently possessed thereby.

Referring to the drawings:

Figure 3 is an exploded view in perspective of the cabinet and base assembly for the washing machine shown in Figures 1 and 2 of the drawings;

Figure 4 is a diagrammatic view of a circuit for automatically controlling the washing cycle for the washing machine shown in Figures 1 and 2 of the drawings;

Figure 6 is an enlarged fragmentary view in vertical cross-section of the float control shown in Figure 1 of the drawings;

Figure 7 is an enlarged fragmentary view in elevation taken in the plane represented by lines 7—7 of Figure 6 of the drawings;

Figure 8 is an enlarged fragmentary view in vertical section of the inner tub or container of the washing machine shown in Figure 1 of the drawings, disclosing more particularly the centrifugally operated valve assembly for cleaning the driving mechanism for the agitators;

Figure 9 is a view partly in elevation and partly in cross-section of the centrifugal pump and water circulating assembly for the automatic washer shown in Figures 1 and 2 of the drawings.

Figure 1:
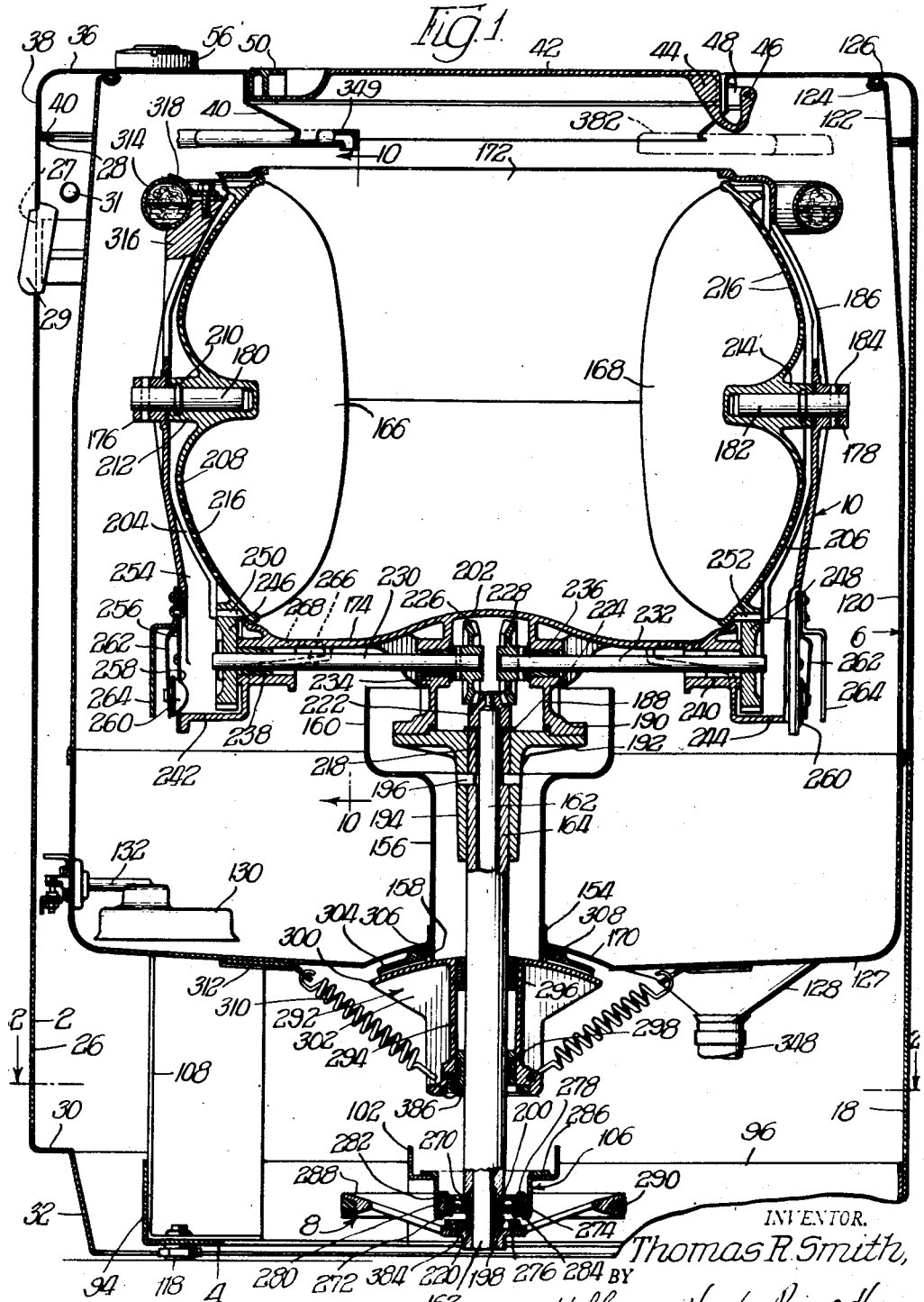
Figure 1 is a vertical cross-sectional view of an automatic washing machine embodying the present invention.

Referring now more in detail to the drawings, an embodiment selected to illustrate the combined washing and drying machine for washing, rinsing and spin drying fabrics and the like, generally comprises an outer casing or cabinet 2 for completely enclosing the various parts of the washing machine, and which is supported upon a base structure 4 which also serves to support an outer stationary tub 6, an inner tub 10 rotatably mounted therein, and power operated means generally referred to as 8, for the washer.

The casing or cabinet 2 is formed of a plurality of parts made from sheet metal, one of said parts being fabricated from a single sheet of metal to provide oppositely disposed side wall panels 12 and 16 and a back wall panel 18, said panels being provided with an inturned horizontally flanged portion 20 along their upper edge, and the said panels 12 and 16 at the forward marginal edges remote from the back panel being provided with inturned oppositely disposed vertically extending flanges 22 and 24. These flanges 22 and 24 are adapted to mate with and be rigidly secured to similar vertical flanged portions provided on opposite sides of a curved front panel 26. This front panel is also provided with an upper horizontally disposed inturned flange 28 disposed in the plane of the horizontal flanges 20 on the side and the back wall panels. The lower portion of the front panel terminates with an inwardly extending flanged portion 30 above the lower edge of the side and back wall panels to provide a toe space for the operator. A separate cover or foot board 32 of somewhat the same contour as the front wall, but fitting closer to the forward marginal edges of the side wall panels, covers this space to provide a smooth-looking front, the same being secured to the base assembly 4 through the inturned flanges 34 at the ends thereof. Disposed above the inturned horizontal flanged portions of the sides, back and front walls is a horizontal relatively flat cover or top 36, preferably formed from a single piece of metal and having vertically extending side portions 38 terminating in the inturned horizontal flanged portions 40 at the lower end thereof which mate with the flanged portions 18 and 28, the same being fastened thereto in any desired manner to form a substantially rectangular unitary box structure with an open bottom adapted to fit about the base assembly 4.

The front panel 26 is provided with an opening 27 preferably at the upper portion thereof, in which is mounted a member 29 of translucent material such as "Lucite" or the like, which may have formed therein certain indicia, such as the name of the maker or any desired trade-name, and which is made easily readable by means of a pilot light 31 connected across the main lines of the circuit for controlling the sequential washing steps, as will be described more fully hereinafter.

The top wall or cover 36 is formed with a centrally located access opening defined by a downwardly and inwardly extending flange 40 to permit access to the inner receptacle or tub 10. This opening is normally closed by the lid or door 42 hinged by the U-shaped member 44 at one end thereof by means of horizontally disposed hinge pins 46 mounted in spaced brackets 48 on the under side of the cover or top wall 36. This lid swings upwardly to a substantially vertical position and is provided with a handle or grip 50 at the end opposite the hinge 44 to provide means for raising or lowering the lid. Adjacent the front panel 26, the top cover member 36 is formed with openings 52 and 54 through each of which loosely extends a shaft, such as shaft 56, of a control device. Each shaft is adapted to be manually actuated by means of a knob or the like for manipulating control mechanism for causing the washing machine to perform various operations to be hereinafter more fully described.

In the present assembly, one of such mechanisms controls the temperature of the water entering the inner receptacle 10 and the other of such mechanisms controls the washing cycle including washing, rinsing and drying operations.

Figure 5:
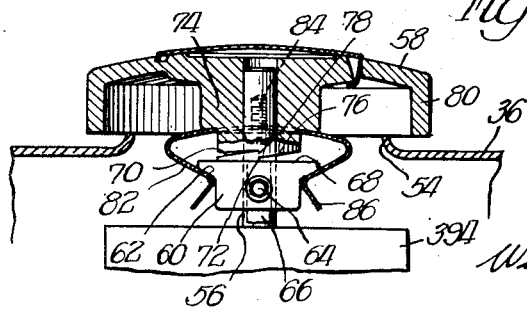
Figure 5 is a vertical cross-sectional view of a control device embodied in the control circuit.
Figure 10:
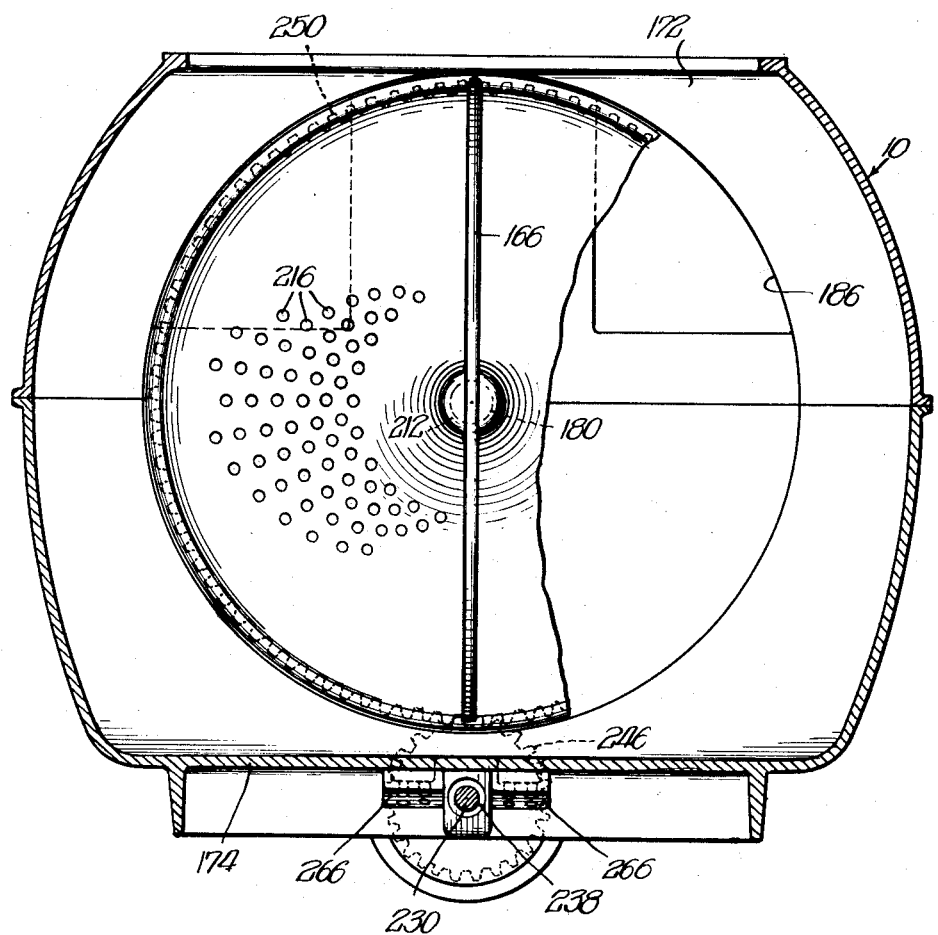
Figure 10 is a sectional view taken in the plane represented by line 10—10 of Figure 1 of the drawings with parts broken away to show certain structure more in detail.

As shown in Figure 5 of the drawings, the manual control means for the timer comprises a clutch collar 60 having a conically shaped shoulder 62 extending outwardly therefrom at its upper portion, the collar being fixed to the shaft 56 by a locking set screw 64 which engages a flat 66 on the shaft 56 to align it in its proper position and rigidly hold it thereon. The upper portion 68 of the collar 60 is flat and has a cam surface 70 which extends upwardly therefrom and which is provided with an abutment 72 through which the shaft 56 may be rotated. The manual control knob 58 is loosely mounted or journaled on the upper end of the shaft 56 and is provided with a hub portion 74 having a cam surface 76 terminating in an abutment or shoulder 78. The shoulder 78 is adapted to engage the shoulder 72 on the collar 60 so that when the outer periphery 80 of the control knob is gripped by the operator and is rotated in a clockwise direction, the two abutments 72 and 78 engage and the shaft 56 is rotated to manually actuate the control mechanism. However, if the operator rotates the control knob in a counter-clockwise direction, the control knob will rotate about the shaft 66, which moves the normally abutting shoulders 72 and 78 apart so that the shaft 56 cannot be rotated during this counterclockwise rotation. It will be apparent that the complementary cam surfaces 70 and 76 terminating in the abutments 72 and 78, respectively, provide a one-way driving connection between the knob 58 and shaft 56.

In order to hold the cam surface 78 of the control knob in position against the cam surface 70 of the collar 60, there is provided a leaf spring member 82 which is secured to the hub 74 by means of the screws 84. The spring is provided at its free ends with the inwardly extending portions 86 which engage the shoulder 62 of the collar 60 to hold the knob in engagement with the collar at all times, regardless of the location of the control knob. The spring 82 is also formed to prevent removal of the knob by the operator or a loss thereof during transit.

Each of the knobs for the control means has indicia applied thereto which is readily readable by the operator for ascertaining the setting of the particular control means which each knob is designed to actuate.

Again referring to the cabinet or casing construction, it will be noted that the lower edge portion of the back and side walls is provided with a series of openings 88 adapted to be aligned with similar openings in the base structure 4 for receiving screws, bolts or other means, for rigidly securing the outer casing to the base member 4 to provide a unitary structure. The back wall of the cabinet may also be provided with a plurality of spaced louvers 90 to permit circulation of cooling air around the motor or other operating mechanisms for dissipating heat within the confines of the cabinet or casing. The back panel of the cabinet is also provided with an opening 92 through which water supply and removal conduits extend.

The base structure comprises four horizontally disposed L-shaped angle irons 94, 96, 98 and 100, disposed to form a rectangular assembly, one leg of the angle irons forming the outer vertical side walls of the assembly and the other leg thereof being disposed inwardly to form the horizontal bottom wall of the structure. The horizontally disposed leg portions of the angle irons are overlapped and are fastened together in any desired manner, as by spot welding, or the like, to form a rigid structure. The vertically disposed leg portions of the angle irons constitute structure to which the cabinet 2 is attached or connected as hereinbefore described. Extending between the oppositely disposed angle irons 96 and 100, and rigidly secured in any desired manner to the horizontally disposed leg portions thereof, is an arched U-shaped channel member 102 formed with a centrally disposed opening 104 adapted to receive a combined radial and thrust bearing, generally referred to as 106, which constitutes the sole means for supporting the inner receptacle 10 on the base structure 4. At each corner of the base assembly 4 there is provided relatively short vertically up-standing L-shaped angle irons 108, 110, 112 and 114 which are rigidly secured to the vertical leg portions of the angle irons 94, 96, 98 and 100 and each of which is provided with an inwardly disposed bracket element 116 secured to the upper end thereof. These brackets provide means for supporting the outer tub 6 which is formed with like brackets which extend in overlapping relation thereto. Any suitable means such as bolts, screws, or the like may be used to secure these brackets together.

Adjacent each corner of the base assembly 4 there is provided an adjustable leg 118 which may be adjusted to maintain all four supporting points of the assembly in contact with the floor or support for the washing machine to maintain the same level and to provide for a solid contact between the machine and the floor or support to reduce vibrations which tend to be set up in the cabinet during operation of the machine. These adjustable leg portions may be provided with projecting elements adapted to penetrate the floor or support which tend to prevent the machine from moving or creeping away from its desired position. Any suitable locking means may be provided to lock the adjustable legs after the washing machine has been leveled.

The outer stationary tub or receptacle 6 is preferably formed at its lower portion with a cylindrical wall 120 and its upper portion has a frusto-conical wall 122 terminating in an open upper end adjacent the cover or top wall 36 to permit access thereto. The upper open end of the tub is provided with an inwardly extending flange 124 formed with a semi-cylindrical groove in the upper portion thereof which is adapted to receive an annular hollow ring shaped seal 126 adapted to engage and press against the under face of the cover or top wall 36 to maintain a fluid-tight seal between the outer receptacle and the cover and to prevent water from being forced from the outer receptacle into the outer casing or cabinet 2. The bottom 127 of the outer stationary tub is formed to facilitate the drainage of washing fluid therefrom to a conically shaped passage 128. Disposed within the lower portion of the tub 6 is a float 130 shown more in detail in Figures 6 and 7 as being in the form of a cup-like member arranged to be floated when water enters the tub 6, the same being mounted upon the actuator rod 132 which extends laterally through and beyond an opening 134 formed in the side wall portion 120 of the stationary tub or receptacle. The actuator rod 132 is provided with an annular groove 136 mounted in the enlarged annular collar 138 of a diaphragm shaped seal 140 of corrugated structure which has an enlarged edge portion 142 clamped in sealed relation to the side wall portion 120 by means of the block or bushing 144. The block or bushing 144 has a central opening in alignment with opening 134 and embraces the actuator rod 132. The block 144 is further provided with a peripheral annular recess for receiving the enlarged edge 142 of the seal and is secured to the side wall portion 120 by means of screws 143 or the like. It will be noted that the diaphragm shaped seal with its enlarged annular collar 138 fitting within the groove 136, provides a mounting for the rod 132 whereby the said rod is fulcrumed for movement in said collar and that the said seal effectively prevents leakage of washing liquid from the outer tub 6 into the outer cabinet. The seal 140 is formed with annular corrugations 141 for strengthening the same so as to provide a suitable support for the rod 132.

Connected to the outer end of actuator rod 132 and insulated therefrom by insulation 145 is a switch operating arm 146 which is formed with a movable contact 148 adapted to be moved into engagement with either of the contacts 150 or 152, the said contacts being included in an electrical circuit to be hereinafter more fully disclosed.

The bottom 127 of the stationary tub 6 is formed with a centrally disposed opening defined by the up-standing annular flange 154 to which is secured stand-pipe 156 in the form of an up-standing sleeve or tubular shaped member. The sleeve 156 projects downwardly below the bottom of the tub, as at 158, and extends upwardly above said bottom and terminates in an enlarged cylindrical portion 160. This up-standing sleeve provides means through which concentrically arranged shafts 162 and 164 extend, these shafts being driven to actuate the agitators 166 and 168 and for rotating the inner tub or receptacle 10. The up-standing sleeve 156 is spaced from the concentrically arranged shafts to permit lateral and gyratory movement thereof, and the same is of sufficient height to prevent any washing liquid which accumulates in the bottom of the tub 6 from flowing out of the central opening defined by the flange 154. The central portion of the tank bottom 127 adjacent to and outwardly of the annular flange 154 is provided with a spherical surface 170 for a purpose to be hereinafter more fully disclosed.

The inner rotary tub or receptacle 10 is disposed within the upper portion of the stationary tub 6 and is spaced from the side walls thereof a sufficient distance to permit of a certain amount of lateral or gyratory movement thereof without contacting the same. The said inner tub is in the general form of a truncated spherical hollow body member terminating in a horizontal plane at its upper marginal edge to provide an access opening 172 which is in alignment with the opening in the cabinet formed by the flange 40 whereby the interior thereof is accessible to the operator. This hollow body member is provided with a substantially horizontally disposed bottom wall 174 opposite the opening 172. Because of manufacturing expediencies the tub is formed to provide upper and lower flanged portions which abut in a substantially horizontal plane adjacent the maximum diameter of the body member, and which are secured thereto at the abutting flange portions by means of bolts, or the like, to provide a unitary structure.

The upper and lower portions of the receptacle 10 are formed with mating hub portions which extend outwardly and in opposed relation to one another to provide the horizontally aligned hubs 176 and 178 which are adapted to receive the stub shafts 180 and 182 secured therein by means of pins or the like 184, upon which the agitators 166 and 168, respectively, are mounted for rotation about a horizontal axis. The tub 10 is further provided with the oppositely disposed offset portions 204 and 206 to accommodate the agitators 166 and 168, respectively, and the driving mechanism therefor, and in the side wall of which is formed a plurality of relatively large openings 186, each of which has its lower marginal edge disposed slightly above the horizontal axes of the stub shafts 180 and 182 which define a maximum liquid level for liquid within the tub 10 and serve to permit the washing liquid to flow therethrough when the level thereof tends to rise above the plane of the lower marginal edges of these openings and also when the tub is rotated about its vertical axis.

The bottom wall 174 of the tub 10 is provided with an integrally formed housing structure 188 concentrically arranged with respect to the vertical axis of the receptacle 10 and having an annular and outwardly extending flange 190 seating upon, and being secured as by bolts or the like, to the outwardly disposed flange 192 of the hub member 194 which is secured to the outer hollow shaft 164 through the medium of pins 196, or any other suitable connecting means. The hollow rotatable shaft 164 extends downwardly through the opening provided in the sleeve member 150 of the outer tub 6 and is formed at its lower end with a reduced portion 198, having a shoulder 200 engaging a combined radial and thrust bearing assembly 106, whereby the inner tub is supported axially solely by this bearing, the said combined radial and thrust bearing assembly serving as a pivot point about which the said tub 10 is rotated, as will be explained more fully hereinafter. The bottom of the tub 10 adjacent the central axis of the same, and immediately above housing 188, is provided with a raised or crowned surface 202 for accommodating certain driving mechanism disposed within the said housing 188.

The agitators 166 and 168 are of similar construction and each comprises a substantially spherical shaped base or disk portion 208 fitting within the offset portions 204 and 206, respectively, to provide a substantially uninterrupted inner surface for tub 10. The agitators are removably secured to shafts 180 and 182 by means of the spring retaining rings 210 fitting within complementary annular grooves formed in the shafts 180 and 182 and the hubs 212 and 214 of the agitators 166 and 168, respectively. The disk portions 208 of the agitators are provided with a plurality of openings 216 which extend therethrough so that water or washing liquid may flow through such openings to the openings 186 and into the outer tub 6. Each of the agitators is preferably provided with a single vane, as illustrated, which extends perpendicularly from each base substantially across its entire width. These vanes, when the agitators are mounted within the receptacle 10, project toward the center of the inner tub 10 and the same are capable of agitating the liquid disposed within the tub or container when the same are rotated. The end portions of the outer edge of the agitator vanes are of curved formation merging into the agitator base at its margin, the said end portions of the outer edge extending outwardly away from the base at a relatively sharp angle and merging with a centrally disposed curved edge which has its apex substantially at the axis of the agitator hub. As shown in the drawings, the vanes 166 and 168 are in the same plane in the vertical and at the end of each successive angular change of 90° therefrom but, if desired, the vanes may be offset angularly with respect to one another.

The inner shaft 162 is journaled in the outer sleeve 164 with its upper and lower portions in the bearings 218 and 220, respectively, and extends upwardly beyond the flange 192 and into the housing 188, the upper end thereof having the bevel pinion 222 secured thereto. The bevel gear 222 is mounted on the upper surface of the outer shaft 164 through the thrust bearing 224, which prevents the inner shaft 162 from moving in a downward vertical direction, and to position the same with respect to the hollow shaft 164. The bevel pinion 222 meshes with the bevel gears 226 and 228 mounted adjacent the inner ends of drive shafts 230 and 232, respectively, which extend outwardly and horizontally in opposed relation and are journaled adjacent their inner ends in the inner bearings 234 and 236 formed in the housing 188 and adjacent their outer ends in the bearings 238 and 240. The bearings 238 and 240 are provided in the recess housings 242 and 244 disposed adjacent to and immediately below the agitators 166 and 168, respectively. Mounted on the drive shafts 230 and 232 adjacent their outer ends are spur pinions 246 and 248 disposed within housings 242 and 244, respectively, which mesh with spur gears 250 and 252 of relatively large diameter, which may be integrally formed with the agitators 166 and 168, respectively, or formed separately and connected thereto. It will be seen from the drawings, that as the drive shaft 162 is rotated in any given direction that the bevel gear 222 connected thereto will rotate the bevel gears 226 and 228 in opposite directions for driving the shafts 230 and 232 and the agitators 166 and 168 operatively connected in driving relation thereto, in opposite directions. Due to the opposite rotation of the agitators, the liquid or cleaning fluid within the receptacle 10 is forced from one side or face of one of the agitators to the oppositely facing side of the other agitator and is forced downwardly and over to the other side of the face thereon and is discharged therefrom and is then caused to flow back to the adjacent face of the first agitator by the second agitator. The opposite rotation of the agitators causes the liquid to flow in a continuous direction in a horizontally circular manner between the agitators and in a vertical semi-circular manner at and adjacent the agitators. The flow, however, will be very turbulent as the body of liquid is moved in the general direction indicated.

The housings 242 and 244 formed as an integral part of the tub or container 10 adjacent the junction of the side and bottom walls thereof enclose the spur pinions 246 and 248 and are each in communication with the interior of the tub by way of channels, such as 254, and the openings 216 in the agitators. Laterally and on both sides of shafts 230 and 232, the housings 242 and 244, respectively, are formed with radially extending portions 266 connected to the bottom wall 174 of the inner tub to provide passageways communicating at one end with the recesses formed by the housings 242 and 244 and at the other end with the interior of the inner tub 10 through openings 268 provided in the bottom wall 174.

Each of the housings 242 and 244 is provided with an opening exteriorly of the tub 10 which is closed by a wall element 256 connected to the tub 10 in any desired manner. The wall is apertured, as at 258, to permit water or cleaning fluid to be discharged from the tub 10 when the same is rapidly rotated in the washing cycle. The opening 258 is normally closed by a valve member 260, spring pressed into such position by means of the spring member 262 which permits the valve member 260 to be opened against the action of the spring during relatively high speed of the tub 10. The outward movement of the valve members 260 is limited by stop elements 264 connected to the tub 10 in any desired manner.

The primary object of the valves 260 is to provide means for flushing dirt and other foreign matter away from the pinions and gears, which may have collected during the washing cycle in the recesses formed by the housings 242 and 244. Water or cleaning fluid for this flushing operation passes from the interior of the tub 10 outwardly through openings 216 in the agitators and channels 254 and through the openings 268 into the recesses formed by the housings 242 and 244.

As previously pointed out, the hollow shaft 164 is formed with a reduced portion 198 providing the shoulder 200 which is in operative association with the radial and thrust bearing assembly generally referred to by the reference numeral 106. More particularly, the said shoulder 200 engages the inner race-ring 270 of the bearing 106 to support the shaft 164 in vertical position. The outer race ring 272 is mounted in and connected to an annular member 274, S-shaped in vertical cross-section, the same being provided with a lower inturned flange 276 for supporting the outer race ring 272 and with an upper outwardly disposed flange 278 which overlaps and engages an annular shaped rubber bushing 280. This bushing, which may be of any desired resilient material, is positioned by an annular dish shaped retaining member 282 which has an inwardly disposed flange 284 on which the annular resilient bushing 280 is mounted and an upper and outwardly extending flange 286 which is disposed within the opening 104 of the channel member 102 and overlaps the same and is rigidly connected thereto in any desired manner.

The inner drive shaft 162 extends downwardly through the hollow shaft 164 and is journaled in the bearings 218 and 220 as previously indicated to prevent relative radial movement between these drive elements. The extreme lower end of the shaft 162 projects downwardly beyond the restricted portion 198 of the hollow shaft 164 and has a driving pulley or wheel 288 keyed or otherwise secured thereto in any suitable manner, whereby the same is adapted to drive the shaft 162. It is to be noted that the reduced end portion 198 is disposed to have its end in abutting relation to the hub of the pulley 288 so as to prevent relative axial movement of the two shafts 162 and 164.

From the foregoing it will be seen that the combined radial and thrust bearing 106 not only supports the receptacle 10 but, through the thrust bearing 224 disposed between the bevel pinion 222 and the supporting hub member 194, maintains the pulley 288 in its proper operative position. As the receptacle 10 is caused to move laterally within the stationary tub 6 during the spinning operation, or if the same is moved in any manner away from its vertical position, the receptacle 10 will tilt about the bearing assembly 106, it being noted that the bearings constitute the sole support for the receptacle 10 and the agitators, and their operating mechanism. The pulley 288 is dish shaped in such a manner that the horizontal plane defining the center of the groove for the driving belt 290 fitting therein, extends through the pivot point of the bearing assembly 106 in order to minimize deflection of the driving belt.

In order to maintain the receptacle 10 in substantially its vertical position, there is provided a combined stabilizing and damper mechanism, generally referred to as 292, which is disposed immediately below the bottom 127 of the stationary tub 6. This mechanism includes a hollow sleeve-like member 294 surrounding the hollow shaft 164 which is provided with two radial bearings 296 and 298 journaled upon the hollow shaft 164 adjacent the upper and lower end portions of the tubular member 294. The upper end of the central tubular member 294 is formed with a spherical shaped wall 300 reinforced by a plurality of downwardly extending webs or brackets 302 which provides a spherical shaped friction surface. The spherical shaped wall 300 is adapted to contact a spherical shaped member 304 formed of friction material which is mounted upon the lower wall 127 adjacent the spherical shaped portion 170 through an annular tubular member 306 which surrounds the downwardly extending end portion 158 of the sleeve 156. The hollow tubular member is preferably formed of some resilient material, the same being adapted to engage an annular shoulder 308 provided adjacent the inner marginal edge of the member 304. Adjacent the lower end of each of the webs or brackets 302, four being provided in the illustrative embodiment of the invention herein described, there is provided an opening engaged by one end of a coil spring 310, which has its other end connected to the stationary tub 6 by means of a bracket 312 connected to the bottom wall 127 thereof. These springs are uniformly spaced around the member 294 so that springs of each pair are disposed in opposite relation to one another and due to the angular position of these springs with respect to the tub and the connection at the lower end of the webs 302, a component of the spring force is applied in a vertical direction to the friction member 304. Since each spring is equally loaded and opposed by an oppositely disposed spring, the tub 10 will be maintained in its vertical position under normal conditions. Should the receptacle 10 tend to move away from the vertical, the spring forces acting through the member 294 will tend to return it to its neutral or vertical posiiton where the spring forces are all equal and opposite. As will be apparent, the surface of the spherical wall 300 is forced by the springs 310 toward the friction member 304 and, as the tub tends to move in a horizontal plane, a certain portion of the energy tending to move the tub is absorbed by the friction member. This friction member, therefore, tends to reduce the amplitude or extent of horizontal movement of the tub and absorbs some of the energy applied thereto.

Disposed about the outer periphery at the upper portion of the tub 10 is an annular or circular hollow tubular balancing member or ring 314 mounted in spaced relation to the receptacle upon a plurality of lugs 316 which are formed integrally with the tub and held in position by clamps 318 which grip the ring and are bolted to the lugs. The inner hollow portion of the balancing ring is packed with steel wool or other material to provide a large amount of exposed area for restricting and retarding to a certain degree the movement of a balancing fluid therein which partially fills the ring. The quantity of balancing fluid used depends upon the type of fluid selected, the size of the ring and the amount of unbalance expected, but preferably the one selected should have a relatively high specific gravity. As an alternative to the use of a balancing fluid in combination with steel wool or the like, a mass of mobile material may be used as the effective balancing medium within the balancing member or ring 314. This balancing ring is utilized to balance the tub when it is rotated about its vertical axis with clothing or the like therein which is not uniformly distributed, the said balancing ring acting in a manner to be hereinafter more fully described.

The driving means for the pulley 288 comprises a reversible motor 320 vertically mounted in, and supported by a frame 322 pivoted to the stationary bracket 326 connected to the vertical supporting element 110 of the base structure 4 for movement about a vertical shaft or axis 324 in remote relation to the axis of the motor. A drive pulley 328 having a V-shaped peripheral groove is connected to the rotor shaft of the motor and is adapted to drive the pulley 288 through the belt 290. The belt 290 is maintained under its proper belt tension by means of a horizontally disposed pre-loaded spring 330 connected at one end to the housing 322 and at its other end to the bracket 332 secured to the base assembly 4, said spring acting to move the motor and its supporting frame 322 about its vertical supporting axis 324 in a direction away from the driven pulley 288.

Figure 2:
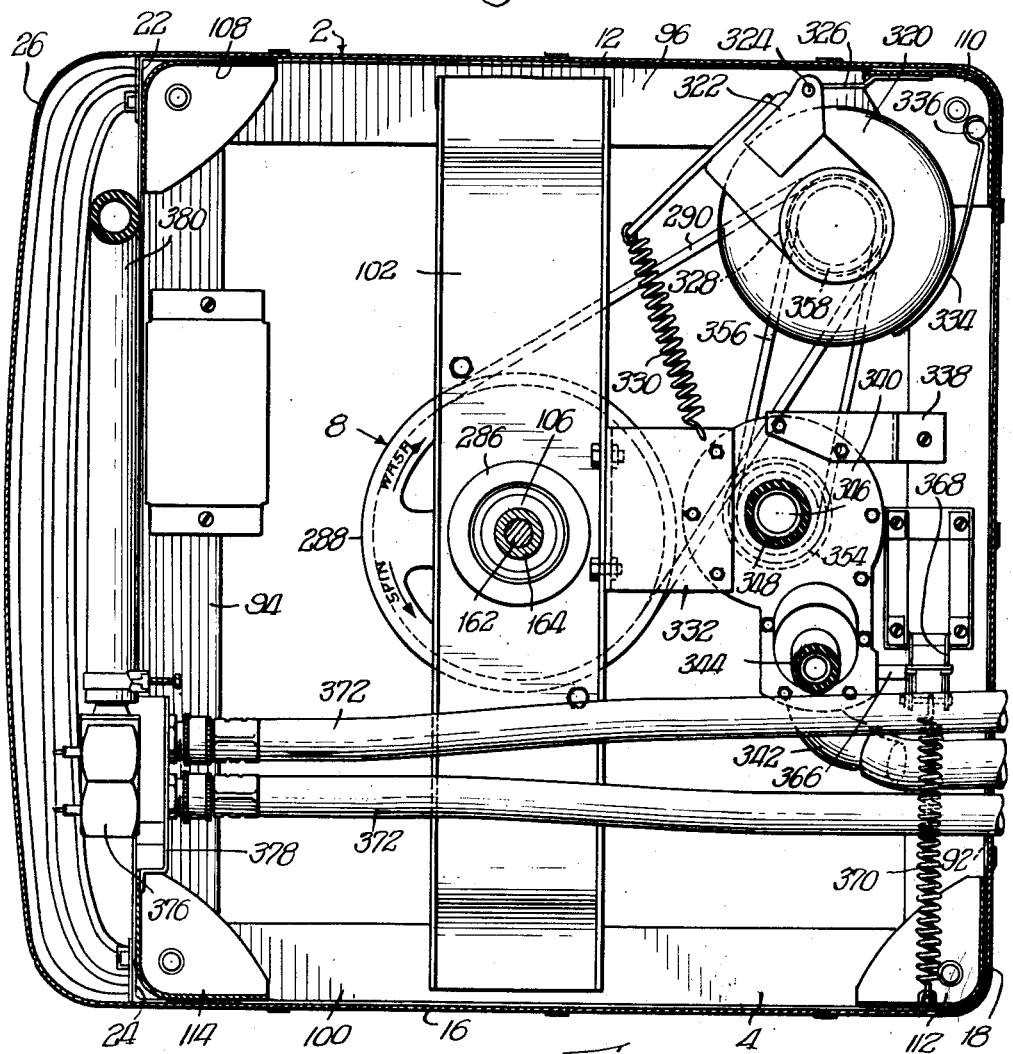
Figure 2 is a horizontal cross-sectional view taken substantially in the plane represented by lines 2—2 of Figure 1 of the drawings.

In bringing the tub 10 and its contents up to spinning speeds, a motor of the size which it is desirable to use in a washing machine of the type herein disclosed, will not attain its operating speed fast enough to prevent the starting winding thereof from burning out. In order to eliminate this difficulty, the motor 320 is pivotally mounted as described and operates in a counter-clockwise direction, as disclosed in Figure 2 of the drawings, to spin the tub 10 and in a clockwise direction to rotate the agitators 166 and 168. The pivot 324 is arranged with respect to the motor so that the reactive torque of the motor operates against the spring 330 which holds the belt 290 tight so that the belt is loosened during the rotation of the motor in a counter-clockwise direction sufficiently to allow the motor pulley 328 to slip on the belt 290. The spring 330 is adjusted so that the motor pulley will slip on the drive belt at a value considered to be the maximum safe output torque of the motor. In the operation of the washing machine, as soon as the motor is rotated in a counter-clockwise direction, as viewed in Figure 2 of the drawings, the same immediately comes up to speed and slips on the belt 290 and provides a maximum safe torque which gradually accelerates the pulley 288 and the structure which is to be rapidly rotated thereby, including the tub 10 and the contents thereof. When the motor is rotated in the reverse direction for operating the agitators, it is evident that the torque required to cause slipping is much greater as the pulley tends to move up on the side of the belt which is closer to the pivot point 324 and, accordingly, there is less leverage tending to move the frame structure 322 against the action of spring 330. With this arrangement, slipping of the motor can be provided for spinning the tub 10 in one direction and ample torque is provided for operating the agitators without danger of belt slippage in the reverse direction. When the motor 320 is operated to spin the tub 10 there will be a tendency under some conditions for the motor to hunt or oscillate about the pivot point 324. In order to prevent this oscillation or hunting of the motor a friction damper is provided. This friction damper comprises a leaf spring 334 connected to the motor housing at one end thereof and being provided at its other end with a transverse groove adapted to hold the friction member 336 therein and against the inside face of the angle iron 110 upon which the motor is pivotally supported.

Rigidly secured to brackets 332 and 333 of the base assembly, and disposed between the drive and driven pulleys 328 and 288, is a reversible pump 340 capable of operating in either direction of rotation of the motor 320 for pumping liquid from the tub 6 either through a conduit 342 to drain, or through a conduit 344 back to the receptacle 10 for recirculation. The pump 340 has an inlet 346 connected by a suitable hose or pipe 348 to the drain 128 at the bottom of the stationary tub 6. The conduit 344 is connected to a discharge nozzle 349 which is adapted to discharge recirculated liquid through the opening 172 into the tub 10. The pump is provided with a shaft 350 mounted in the pump housing and has an impeller 352 fixed to its inner end and a drive pulley 354 fixed to its outer end exteriorly of the housing. The pulley 354 is formed with a V-shaped annular peripheral groove adapted to receive a belt 356 which is driven by pulley 358 fixed to the drive shaft of the motor 320. The control of the flow of liquid either for recirculation through the conduit 344 or to drain through the conduit 342 is effected by means of a double-acting valve 360 disposed on the discharge side of the pump and pivotally mounted in the pump housing. The said valve comprises a body member 362 having oppositely arranged seal members 364 attached thereto, the said body member being mounted upon the shaft 366 which is rotated by means of a solenoid 368 to move the valve body 362 to control the flow of liquid either through conduit 342 or 344. Spring means 370, connected at one end to the armature of the solenoid 368 and at its other end to the base structure 4, is provided to normally maintain the valve body 362 in a position to close the outlet 342. The operation of this valve in the washing cycle will be hereinafter more fully described.

Water for washing is admitted to the casing through hot and cold water conduits 372 which are connected to a solenoid operated mixing valve 376 mounted on bracket 378 secured to the base assembly 4. From this valve there extends a conduit 380 leading to nozzle 382 mounted in the upper portion of the outer tub 6 and positioned for discharging water into the inner receptacle 10. The valve 376 is provided with a selector switch operated by one of the control devices disposed on the cover or top 36 so that the temperature of the water for the washing operation may be hot or warm as desired. This selective control is the only one possible, however, for the reason that the rinses in the washing cycle are performed with warm water only. Inasmuch as any suitable type of thermostatically controlled mixing valve may be utilized, a further discussion of the valve structure is not important insofar as the present disclosure is concerned.

Mounted on the inner side of the hub of the driven pulley 288 is a one-way clutch 384 comprising a body portion having tapered slots therein which have their openings disposed adjacent the reduced end portion 198 of the hollow shaft 164. A plurality of rollers are disposed in these slots so that when the driving pulley 288 is rotated in a clockwise direction, as viewed in Figure 2 of the drawings, as, for example, when the agitators 166 and 168 are being operated, the rollers will be disposed in the larger part of the slots and, accordingly, no turning movement is applied to the hollow shaft 164 upon rotation of the pulley 288. At this time the pulley 288 which is connected to the shaft 162 causes rotation thereof for operating the said agitators. When the direction of rotation of the pulley 288 is reversed, however, the rollers move along the tapered slots and grip the hollow shaft 164 to effect a driving connection between the pulley 288 and said hollow shaft 164. It will be apparent that during this operation the inner and outer shafts 162 and 164 are rotated together in the same direction, and at the same speed, and inasmuch as there is no relative movement therebetween, the agitators 166 and 168 are maintained stationary with respect to their axes of rotation but the same will be revolved about the vertical axis of the tub 10.

During the rotation of the inner shaft 162, when the agitators 166 and 168 are rotated for a washing operation, there is a natural tendency for the receptacle 10 to rotate with the inner shaft 162 which, if permitted, would reduce the effectiveness of the washing action of the agitators. In order to maintain the tub 10 stationary during the washing operation there is provided a one-way clutch 386 mounted in the lower end of member 294 of the stabilizing and damper mechanism 292 which is adapted to hold the tub 10 and to prevent its rotation. This one-way clutch is similar to the one-way clutch 384, except that the tapered slots formed in the body portion are disposed oppositely to the tapered slots in the one-way clutch 384. When the shaft 162 is rotated to rotate the agitators, the rollers of this one-way clutch 386 are positioned to grip the hollow shaft 164 and, inasmuch as the stabilizing and damper mechanism 292 is connected to the stationary tub 6 through the springs 310, rotation of the hollow shaft 164 cannot occur. When the rotation of the driving pulley is in the reverse direction and the one-way clutch 384 grips the outer hollow shaft 164 to cause the tub 10 to rotate about its vertical axis, the one-way clutch 386 is released.

In a washing and drying machine of the type herein disclosed it is desirable to provide means for automatically operating the same. The present invention, accordingly, contemplates control means including a timer motor adapted to rotate a plurality of cams for actuating switch means in a predetermined sequence to cause the apparatus to perform its various functions automatically. Such automatic control means as contemplated by the present invention is diagrammatically shown in Figure 4 of the drawings, the same comprising a manually operable main switch 388 which is adapted to be associated with one of the control devices as more specifically shown in Figure 5 of the drawings. This main control switch 388 controls the main line circuit $L^1$ and $L^2$. Incorporated in the control circuit is a timer motor 394, the reversible motor 320, the thermostatically controlled mixing valve 376, the drain and recirculating valve 362 and the pilot light 31. The pilot light 31 is connected directly across the main line $L^1$ and $L^2$ and is lighted whenever the manually operated switch 388 is closed. The remaining mechanisms enumerated are connected directly to one side of the line and to the other side of the line through a plurality of cams 400, 402, 404, 406, 408, 410 and 412 which are driven in one direction only by the timer motor 394. The single acting cam 400 is provided to control the operation of the drain and recirculating valve 362 and to operate reversing switch 414. Cams 402 and 404 are adapted to control the reversing motor 320, cams 406 and 408 control the hot and warm water valves 396 and 398, respectively, of the thermostatically controlled mixing valve 376, and cams 410 and 412 are provided to control the timer motor 394. The washing cycle includes a washing period, a spinning period during which a flush rinse is applied to the clothes for a short interval, for example, 30 seconds, to remove soapy water from the clothing and the tub, an agitate rinse period and a spin period during which a final flush rinse is applied to the fabrics being washed, an additional spin period, and an "off" or "inactive" period where the washing machine is not in operation. This cycle of operation with the selected time intervals for each period is set out at the left of the diagram shown in Figure 4, but it is of course understood that any selected time intervals may be chosen as desired.

The reversible motor 320 includes a running winding 416 connected in the circuit for the reversing switch 414 through the conductors 418 and 420. The motor is also provided with a starting winding 422 connected on one side to the main line $L^2$ through the conductor 424 and on the other side to the main line $L^1$ through conductor 426, centrifugal switch 428, holding relay 430, conductor 432 to one side of the cam 402 and thence from the other side of the cam 402 to the main line $L^1$ through the conductor 434. The centrifugal switch 428 is an ordinary type of centrifugal switch built into the motor 320. The reversing switch 414 is designed for reversing the motor, while the holding relay 430 is for the purpose of allowing the reversing switch to be operated while the motor is running at full speed. The holding relay 430 is connected in series with the centrifugal switch 428 so that when the motor is reversed the holding relay 430 drops out and the main or running winding is reversed with respect to the starting winding by the reversing switch 414 and the starting winding does not go back into operation until the motor has slowed down and allows the centrifugal switch 428 to drop back into the circuit. At the time the centrifugal switch drops back into circuit, the holding relay 430 is energized through the cam 402 and its circuit connected across the main lines $L^1$ and $L^2$, so as to energize the running winding in the reverse direction whereby the motor slows down to a stop and starts up again in the reverse direction.

The double-acting drain and recirculation valve 362 at the discharge end of the pump is normally in a position to close the passage to the drain conduit 342 thus opening the passage to the recirculation conduit 344. It is only during the spin periods that the valve 362 is moved through the action of the solenoid 368 to close the recirculation passage 344 and permit the liquid within the outer tub 6 to be pumped to drain. The solenoid 368 is connected in circuit with the reversing switch 414 through the conductors 436 and 438, the conductor 436 being connected to the line L² through the conductor 440 and the conductor 438 being connected to line L¹ through the conductor 442 to one side of the cam 400, the other side of the cam being connected through the conductor 444 to said line L¹.

One side of the cams 410 and 412 controlling the timer motor 394 is connected to line L² through the conductors 446 and 448, the stator winding 450 for the timer motor 394, and conductor 452. The other side of the cam 412 is connected to line L¹ through the conductor 454, contacts 150 and 148 of the float valve switch, and conductor 456. This circuit is provided so that during the periods when the receptacle is being filled with water prior to both the washing and agitating rinse periods, the timer motor will be deenergized until there is a sufficient quantity of water flowing from the inner receptacle 10 to the bottom of the tub 6 to close contacts 150 and 148 when the control float 130 is raised. This contact 150 is also connected to the circuit for the reversible motor through the conductor 458 to one side of cam 404 which has its other side connected to the conductor 432 of the holding relay 430 through the conductor 460. This circuit is effected during the washing and agitating rinse periods at which time float 130 is raised to close contacts 150 and 148, and the motor 320 is operated to rotate the agitators 166 and 168. The other side of cam 410 is connected directly across line L¹ through the conductor 462. It will, therefore, be apparent that although the cam 412 is positioned to energize the timer motor it cannot do so until a sufficient quantity of water is accumulated in the tub to close the contacts 150 and 148. When the tub 10 is rotated at high speed during the spin periods, the energization of the timer motor is shifted to cam 410 which, as previously indicated, has one side connected to line L² through the stator winding of the timer motor and the other side connected to line L¹ through the conductor 462.

The thermostatically controlled mixing valve 376 is provided with a selector switch 464 having a movable contact 466 and the stationary contacts 468 and 470, this switch being provided so that the operator can selectively determine the temperature of the washing fluid, that is, a selection between a hot and warm washing fluid. If hot water is desired for the initial washing operation, the switch is operated to move contact 466 into engagement with contact 470 for energizing the circuit through cam 408 to operate the hot water valve 396. This circuit can be traced from line L² through the conductor 472, solenoid 474 for the hot water valve 396, contacts 470 and 466, conductor 476, to one side of cam 408, the other side of cam 408 being connected to the line L¹ through conductor 478, contacts 152 and 148 and conductor 456. If it is desired to wash with warm water, the manually operated switch 464 is shifted to close contacts 468 and 466 to operate the warm water valve 398. This circuit may be traced from the line L² through the conductor 480, solenoid 482 for the warm water valve 398, contacts 468 and 466, conductor 476, to one side of the cam 408, the other side of the cam being connected through the conductor 478, contacts 152 and 148 and conductor 456 to the line L¹. When warm water is desired for the initial washing the hot water valve 396 is not operated. The selector switch 464 is controlled by the water control knob located at the top of the machine.

As will be apparent, the control cam 408 is operative during the washing period only to introduce a supply of warm or hot water into the receptacle 10. When the cams are initially operated to start the cycle of operation, cam 408 is shifted to complete one of the circuits above described for introducing either warm or hot water into the tub 10. At that time float 130 is in its lowermost position whereby contact 148 is in engagement with contact 152. Water is introduced into the tub 10 through the nozzle 382 until there has been a sufficient amount of overflow into the tub 6 to cause the float 130 to be raised, breaking the contacts 148 and 152 and closing contacts 148 and 150. From this point in the washing cycle, hot water can no longer be supplied to the receptacle, regardless of the position of the switch 464. During the remaining portion of the washing cycle the cam 406 takes over to control the introduction of warm water through the operation of the warm water valve 398. This warm water valve is operated during the first flush rinse, opened to supply water to the tub 10 for the agitate rinse and for the final flush rinse, all as disclosed on the diagram.

The water admitted to the tub 10 during the flush rinse periods is under control of the timer motor which, during these periods, is operating directly across the main line through the closed contacts of cam 410. At this time the float 130 is in its lowermost position and contacts 148 and 152 are closed to energize the circuit for the warm water valve 398 through cam 406. From the foregoing it will be apparent that the quantity of water admitted to the receptacle for both the wash and agitate rinse periods is dependent upon the actuation of the float 130 disposed within the lower portion of the stationary tub 6, while the flush rinses are dependent upon the actuation of the timer motor 394.

When the timer is manually set to its starting position, its cams are rotated, and cams 404 and 412 for energizing the reversing motor 320 and the timer motor 394, respectively, are positioned to complete the circuits for the operation of these motors, although the motors are not operated at this point in the cycle of operation for the reason that the main running winding 416 of the motor is connected in circuit with the contact 150 of the float switch. Inasmuch as the float is in its lowermost position, movable contact 148 of the float switch is out of engagement with the contact 150 and the said motors will not be energized until a sufficient quantity of water causes the float to close the timer and motor circuits through these contacts. At this time, however, circuits for either hot or warm water valves 396 or 398 will have been energized and water will be caused to flow into the receptacle 10. When the float 130 rises and closes the contacts 148 and 150, the circuits hereinabove traced for the starting and running windings for the motor 320 are energized through cam 404, and the circuit for the timer motor hereinabove described is likewise energized through the cam 412. The holding relay 430 operates as previously described to insure that the motor 320 will always run in the desired direction should the circuit therefor be interrupted for any reason.

After the washing and agitate rinsing operations, the motor 320 is energized and the holding relay released, at which times cam 400 operates to energize the solenoid 486 of the reversing switch 414 to reverse the flow of current through the running winding 416. This circuit by-passes the circuit through the contacts 148 and 150 of the float switch. It will thus be seen that the direction of rotation of the motor is determined by the cams and the timer and that the running period for the motor is also controlled by the length and position of the cams for any particular period of the washing cycle.

The washing and drying machine above described is automatically operated through a complete washing cycle without it being necessary for the operator to do anything other than adjust the control knobs on the upper part of the machine, prior to the time that the machine is set in operation. In accordance with the contemplated operation of the washing and drying machine, the operator opens the lid 42 and places the clothes or fabrics to be washed in the receptacle 10. A proper quantity of a detergent is then poured into the receptacle, after which the lid is closed and the water temperature selected by moving the water selector knob to either its warm or hot position. For the purpose of the following description of the operation of the machine, it is assumed that the operator has turned the water selector to its hot position. The timer control knob is then rotated to a position corresponding to the length of time desired for the washing period as shown by indicia on the knob. These are the only manual operations required of the operator. When the timer control knob is turned, the timer cams are positioned as previously described and the solenoid 474 for the hot water valve is energized to complete a circuit across the lines $L^1$ and $L^2$, at which time water flows from the valve through the conduit 380 and nozzle 382 into the tub 10. Both the cams 402 and 404, 410 and 412 for the reversible motor and the timer motor are positioned and the motors are deenergized because contacts 148 and 150 of the float control switch are open. The water flowing into the receptacle 10 from the mixing valve 376 fills the receptacle to the level of the bottom edges of the over-flow openings 186 provided in the tub 10 and over-flows into the bottom of the stationary tub 6 and accumulates therein until a water level is reached where the float valve 130 is actuated to close the contacts 148 and 150. At this time the timer motor 394 is energized through the circuit hereinabove described to rotate the timer cams in a predetermined sequence. The circuit for the motor 320 as hereinabove described is also completed at this time and the motor begins to rotate in a clockwise direction as viewed in Figure 2 of the drawings, whereby the drive pulley 328 rotates the pulley 288 through the belt 290. Rotation of pulley 288 causes rotation of the centrally disposed drive shaft 162 to cause the agitators 166 and 168 to rotate in opposite directions. At this time the one-way clutch 386 is effective to prevent rotation of the outer hollow shaft 164 and the tub 10 connected thereto. The rotation of the agitators in opposite directions causes the water and fabrics within the tub 10 to be violently agitated and the same are forced back and forth between the agitators in a somewhat circular manner in horizontal directions; while at and adjacent the agitators the direction of motion is changed and the same are caused to move with the agitators about a horizontal axis and then away from one agitator to the opposite portion of the opposite agitator. This combined motion effectively washes the fabrics and any tendency for the same to become tangled by the continuous rotation of each of the agitators in one direction is counteracted to a large degree by the opposite twisting and untangling applied thereto by the opposite agitator.

During the washing cycle, the water which over-flows through the openings 186 in the receptacle by the rotation of the agitators, tends to carry scum and dirt with it and, as this water falls into the bottom of the outer stationary tub 6, the water is returned to the inner tub 10 by the pump 340 by means of the reciprocating conduit 344 and the recirculating nozzle 349.

When the agitators have been rotated for a predetermined length of time, determined by the setting of the control knob, the timer motor will have advanced the cams to deenergize the circuit for the driving motor 320, whereupon rotation of the agitators is stopped and the washing action ceases. It is to be noted that during this time the water remains in the tub 10 at the level determined by the openings 186 and does not drain therefrom. After a time interval the timer motor operates the cam 400 to reverse the direction of flow of current in the main winding of the driving motor. When this occurs the initial torque acts in such a direction as to permit the motor to swing about its vertical pivot 324 toward the driven pulley 288 which causes the belt to become loose. As the motor comes up to speed, it is returned toward its belt tightening position by means of the preloaded coil spring 330 and the direction of rotation of the driven pulley 288 is reversed. At this time the one-way clutch 384 is actuated to grip the outer hollow shaft 164 to rotate the same while at the same time the one-way clutch 386 mounted in the stabilizer and damper 292 is released due to the reverse rotation of shaft 164.

Due to the fact that the agitators and the tub 10 with the water and fabrics therein have relatively high inertia, the initial torque or load of the driving motor will be very high. Because of such a load, the motor 320 is pivotally mounted at 324 and when the torque exceeds a predetermined value the motor will move in a direction to loosen the belt and permit the driving pulley 328 to slip with respect to the belt 290. It will therefore be seen that with the proper spring tension the motor torque can never exceed a predetermined value because the pivotal mounting will always permit the motor to move in a direction to permit belt slippage if the motor is overloaded. However, this motor torque will be maintained substantially constant by the spring 330 during this period so that a constant accelerating force may be applied to the tub 10 and its contents. As the speed of rotation of the tub 10 increases and the water therein is forced up along the side walls thereof into the rear of the agitators, the same is discharged through the openings 186 into the bottom of the stationary tub 6. Simultaneously with the discharge of water through the openings 186, water is also discharged through the centrifugal valves 260.

The provision of maintaining water in the tub 10 during the first part of the spin period is important because it tends to maintain the tub 10 in a balanced condition at this time. Thus, for example, if the fabrics are not equally or uniformly distributed about the tub, as will be more common in the majority of cases, the tub during the time when it is brought up to its operating speed of rotation would move in a horizontal plane or wobble about its vertical axis and may, under certain conditions, be moved laterally to the extent where the same strikes the outer stationary tub 6 which may either cause damage thereto or prevent the tub 10 from accelerating to its normal operating speed of rotation. In other words, it would be very unlikely that the tub could be rotated through its critical speed. By maintaining the water within the tub 10, uneven distribution of the fabrics becomes immaterial as the weight of the water will maintain the tub in a substantially perfect balance at this time. As the tub picks up speed it passes through a critical period of oscillation determined by the weight of the tub, the water and the clothes disposed therein and the resiliency of the springs 310. The supporting springs 310 are for the purpose of keeping the tub centered, and when the tub passes through its critical speed, there will be a tendency for the amplitude of the gyratory movement thereof to increase. Accordingly, it is necessary to provide means for dampening out such gyratory movement. This is effected by the stabilizing and damping assembly 292 mounted in association with the hollow shaft 164. As the spinning tub wobbles due to its out of balance condition, the hollow member 294 will move with the hollow shaft 164 thus causing the spherical surface 300 to be moved over the spherical surface of the friction member 304. The friction or damper shoe 304 is insulated from the tub 6 by means of the tubular member 306 formed of resilient material. This insulation is to prevent noise from being carried through the tub and to also allow the damper shoe 304 to center itself and bear evenly on the face of the spherical wall or surface 300. The contacting surface of the wall 300 and damper shoe 304 being spherical allows even and continuous contact between the same while the hollow member 294 is wobbling due to unbalanced loads in the tube 10.

In addition to the stabilizer and damper assembly 292 which prevents too great a shift in the center of gravity, an additional balancing device in the form of the toroidal member 314 is provided and rigidly fastened to the tub 10 adjacent the top thereof. This tubing is partially filled with a heavy liquid and steel wool for damping the flow of liquid therein. The balancing ring is placed near the top of the tub 10 so that it will be most effective for each unit of weight of liquid provided inside the ring. The balancing device does not become effective on acceleration of the tub 10 until after the critical speed has been passed, but upon deceleration the balancer is effective through the critical speed of rotation. Above the critical speed the tub and its contents tend to rotate about a new center of gravity which is different from the geometrical center of the tub depending upon the unbalanced load therein. This shift in the center of rotation is toward the center of mass of the unbalanced load which causes the fluid in the toroidal tubing to move in the opposite direction, thereby tending to compensate for this unbalanced load condition. Due to the fact that under normal conditions there is water within the inner tub when the same starts to spin, this mass of water restricts the degree of wobble which might be caused by an unequal distribution of fabrics. By properly selecting the springs 310 and the amount of friction created between the surface of the damper wall 300 and the damper shoe 304, as well as the mass of the tub 10, the critical speed is held low enough so that there is still a large quantity of water in the tub 10 as it passes through its critical speed of rotation. This acts as a means for balancing the unbalanced load up to and through the critical speed of rotation of the tub after which the toroidal balancer ring tends to maintain the tub in its normal vertical position. As the tub is rotated past its critical speed, water is then finally thrown out of the inner tub and out of the clothing, but at these speeds the balancing ring has taken over and once the balancing ring is activated above critical speed it will tend to maintain the tub in substantially its vertical position as the same decelerates through and below its critical speed of rotation.

As the water is discharged from the rotating tub 10 it falls to the bottom of the stationary tub 6, flows through the drain opening 128 to the centrifugal pump 340 and as the valve 362 has been moved to close the normally open recirculating conduit 344 by means of the solenoid 368 which is actuated by the timer cam 400, the water so discharged is pumped to drain.

During the latter portion of the initial centrifuging period at the end of the washing cycle, and after substantially all the soapy water has been removed from the receptacle, the cam 406 controlling the warm water valve 398 is actuated to complete a circuit as hereinbefore described to admit warm water into the tub 10 to flush rinse the clothes or fabrics therein. It is at this time that fresh water is admitted to the rotating tub to remove a relatively high percentage of the soap remaining in the clothes after washing. This rinse water is likewise discharged to drain by means of the pump. A short time after this flush rinse period, the reversing motor 320 and the timer motor 394 are deenergized and the warm water valve 398 is again actuated and the tub 10 is filled with clear water which overflows through the openings and collects at the bottom of the tub 6 to actuate the float 130. When the float 130 is actuated, the reversing motor 320 and the timer motor 394 are again energized to rotate the agitators while the tub 10 is held stationary, during which time the clothes or fabrics are given a thorough agitating rinse.

At the end of this agitate rinse period, the motor 320 is again deenergized and after a timed interval is again reversed to rotate the tub in the manner heretofore described. After the tub 10 has passed through this critical speed and the water has been discharged therefrom and pumped to drain, the final flush rinse is admitted by means of the cam 406 of the timer and this water is likewise discharged from the tub 10 to drain. After this flush rinse, the operation of the tub is continued a given period of time to permit the clothes to be centrifuged until a large portion of the moisture has been removed therefrom, after which the timer moves the control knob to its off position to deenergize the control circuit and the operator need only open the lid or cover 42 and remove the clothes from the tub 10. During this cycle of operation the clothes which were placed in the tub are washed, have the wash water removed therefrom, flush rinsed to remove soapy water, then rinsed with agitation, the rinse water is removed, the clothes subjected again to a flush rinse during spinning and finally the same are rotated for a period of time to remove a large percentage of the moisture in the clothes or fabrics.

From the above description it will be readily apparent that the machine is relatively simple in construction, has relatively few moving parts with a minimum number of gears and requires but a single bearing to support the inner tub and agitators. Also, by using the above described balancing ring on the tub, eccentric loadings in the tub cannot affect the operation materially in that the balancing ring always acts in a direction to tend to return the tub to its vertical position after the same has passed through its critical speed. In this manner, vibrations or other deteriorating forces normally set up in an unbalanced rotating receptacle are reduced to a minimum.

The machine as above described does not necessarily have to be made to operate in an automatic cycle inasmuch as it is possible to manipulate the control knob for the timer to move the various valves and operating mechanisms to their various positions manually or it can be made to operate semi-automatically.

While I have herein described and upon the drawings shown an illustrative embodiment of the invention, it is to be understood that the invention is not limited thereto but may comprehend other constructions, arrangements of parts, details and features without departing from the spirit of the invention.

It is claimed:

1. In a washing machine, the combination of a rotatable tub adapted to receive liquid and material to be washed, a source of power, washing means mounted for operation substantially about a horizontal axis within said tub, means operable in one direction by said source of power for operating said washing means for effecting a washing operation within said tub, and means operable in the reverse direction by said source of power for rotating said tub to extract liquid from the material contained therein.

2. In a washing machine, the combination of a rotatable tub adapted to receive liquid and material to be washed, a plurality of washing devices mounted adjacent the side wall of said tub for operation about an axis disposed at an angle to the vertical axis of said tub, and means for operating said washing means to effect a washing operation within said tub and for rotating said tub to extract liquid from the material contained therein.

3. In a washing machine, the combination of a rotatable tub adapted to receive liquid and material to be washed, oppositely disposed washing devices mounted for rotation about a horizontal axis within said tub, a source of power, means operable in one direction by said source of power for rotating said washing devices in opposite directions for effecting a washing operation within said tub, and means operable in the reverse direction by said source of power for rotating said tub to extract liquid from the material contained therein.

4. In a washing machine, the combination of a vertically supported rotatable tub adapted to receive liquid and material to be washed, oppositely disposed washing devices mounted within said tub for rotation about an axis disposed at an angle to the vertical axis of said tub, a power shaft, means operable upon rotation of said power shaft in one direction of rotation for rotating said washing devices in opposite directions for effecting a washing operation within said tub, and means operable upon rotation of said power shaft in the reverse direction for rotating said tub to extract liquid from the material contained therein.

5. In a washing machine, the combination of a tub having an opening in the top thereof adapted to receive liquid and material to be washed therein, a vertically disposed power shaft concentrically arranged with respect to the vertical axis of said tub, oppositely disposed washing devices each comprising a base mounted for operation on the side wall of said tub, and means extending laterally of and being driven by said power shaft, said means including means operatively connected to said washing devices in driving relation thereto adjacent the outer periphery of the base for said washing devices.

6. In a washing machine, the combination of a tub adapted to receive liquid and material to be washed and having its side wall formed with oppositely disposed offset portions, agitating devices mounted for rotation in said side wall and each having a base disposed in an offset portion of said side wall to provide a substantially continuous uninterrupted inner surface for said tub, said offset portions being provided with overflow openings defining a liquid level, the base of each of said agitating devices being formed with a plurality of openings therethrough to provide passages for liquid from the inner portion of said tub to said overflow openings, a drive means, means effective upon rotation of said drive means in one direction to rotate said agitating devices in opposite directions for effecting a washing operation within the tub, and means effective upon rotation of said drive means in the reverse direction for rotating said tub to extract liquid from the material contained therein.

7. In a washing machine, the combination of a rotatable tub adapted to receive liquid and material to be washed, an agitating device disposed within said tub and mounted for operation about a horizontal axis, said agitating device having a base disposed adjacent the side wall of said tub, said tub having a recess disposed below said agitating device, a power shaft for operating said agitating device including a driving element disposed within said recess and being operatively connected in driving relation to said agitating device, a centrifugally operated valve means provided in said side wall in communicating relation to said recess, and means establishing communication between said recess and the interior of said tub for flow of liquid through said valve means upon rotation of said tub.

8. In a washing machine, the combination of a rotatable tub adapted to receive liquid and material to be washed, said tub having its side wall formed with an offset portion terminating in a recess disposed adjacent the bottom wall thereof, an agitating device mounted for operation in said side wall and having a base disposed in said offset portion to provide a substantially continuous uninterrupted inner surface for said tub, said tub having overflow openings defining a liquid level and the base of said agitating device having openings to establish communication between the interior of said tub and said overflow openings, a power shaft for operating said agitating device including a driving element disposed within said recess and being operatively connected in driving relation to said agitating device, a centrifugally operated valve means provided in said side wall in communicating relation to said recess, and means establishing communication between said recess and the interior of said tub for flow of liquid through said valve means upon rotation of said tub.

9. In a combined washing machine and extractor, a rotatable tub having an opening in the top thereof adapted to receive liquid and material to be washed therein, said tub having its side wall provided with at least one hub portion providing means for supporting an agitating device for operation in a horizontal axis and provided with at least one overflow opening adjacent said hub portion for defining a liquid level within said tub, said tub being further provided with at least one recess located adjacent the junction of the bottom and side walls of said tub, said side and bottom walls being provided with openings establishing communication between the interior and exterior of said tub for flow of liquid through said recess upon rotation of said tub, and centrifugally operated valve means for said last named opening in said side wall.

10. In a washing machine, the combination of a rotatable tub adapted to receive liquid and material to be washed, oppositely disposed agitating devices mounted in said tub for rotation about a horizontal axis, a centrally disposed housing depending from the bottom wall of said tub and having spaced bearings, bearings disposed in spaced relation to and in alignment with said first named bearings, driven shafts mounted in said aligned bearings, inner and outer shafts concentrically disposed with respect to the vertical axis of said tub, means connecting said driven shafts to said inner shaft and to said agitating devices for rotating the same in opposite directions to effect a washing operation within said tub, and means connecting said outer shaft to said housing for rotation of said tub to extract liquid from the material contained therein.

11. In a washing machine, the combination of a rotatable tub adapted to receive liquid and material to be washed, oppositely disposed agitating devices mounted in said tub for rotation about a horizontal axis, said agitating devices being formed with a gear adjacent the periphery thereof, a centrally disposed housing depending from the bottom wall of said tub and having spaced bearings, bearings disposed in spaced relation to and in alignment with said first named bearings, driven shafts mounted in said aligned bearings, an inner shaft, gear means connecting said inner shaft to said driven shafts, said driven shafts having gears mounted adjacent the outer ends thereof meshing with the gears of said agitating devices, an outer shaft connected at its upper end to said housing and supported adjacent its lower end to provide for tilting movement of said tub, said inner shaft being mounted adjacent its upper end on said outer shaft, power means connected to said inner shaft for rotating said agitating devices in opposite directions to effect a washing operation within said tub upon rotation of said inner shaft in one direction, means for holding said tub stationary upon rotation of said inner shaft in said one direction, and means for effecting a driving connection between said power means and said outer shaft upon rotation of said inner shaft in the reverse direction for rotating said tub to extract liquid from the material contained therein.

12. In a washing machine, the combination of a rotatable tub adapted to receive liquid and material to be washed, means including plural concentric shafts arranged coaxially with respect to the vertical axis of said tub for rotating said tub to extract liquid from the material contained therein, means for supporting said tub for tilting movement relative thereto and about a point adjacent the lower end of said shaft means, friction means disposed between said tub and said supporting means resisting tilting movement of said tub, and flexible means for centering said shaft means.

13. In a washing machine, the combination of a rotatable tub adapted to receive liquid and material to be washed, means including plural concentric shafts arranged coaxially with respect to the vertical axis of said tub for rotating said tub to extract liquid from the material contained therein, means for supporting said tub for tilting movement relative thereto and about a point adjacent the lower end of said shafts, cooperating friction elements disposed between said tub and said supporting means adapted to resist tilting movement of said tub, and means operable to center said shafts and for maintaining the cooperating frictional engagement of said elements.

14. In a washing machine, the combination of a rotatable tub adapted to receive liquid and material to be washed, means including plural concentric shafts arranged coaxially with respect to the vertical axis of said tub for rotating said tub to extract liquid from the material contained therein, means for supporting said tub for tilting movement relative thereto and about a point adjacent the lower ends of said shafts, cooperating friction elements adapted to resist tilting movement of said tub, means operable to center said shafts and for maintaining the cooperating frictional engagement of said elements, and balancing means connected to and being disposed adjacent the upper end of said tub.

15. In a washing machine, the combination of a rotatable tub adapted to receive liquid and material to be washed, means including plural concentric shafts arranged coaxially with respect to the vertical axis of said tub for rotating said tub to extract liquid from the material contained therein, means for supporting said tub for tilting movement relative thereto and about a point adjacent the lower end of said shafts, cooperating friction elements adapted to resist tilting movement of said tub, means operable to center said shafts and for maintaining the cooperating frictional engagement of said elements, and balancing means connected to and being disposed adjacent the upper end of said tub, said balancing means including a confined body of mobile material.

16. In a washing machine, the combination of a rotatable tub adapted to receive liquid and material to be washed, means including plural concentric shafts arranged coaxially with respect to the vertical axis of said tub for rotating said tub to extract liquid from the material contained therein, means for supporting said tub for tilting movement relative thereto and about a point adjacent the lower end of said shafts, cooperating friction elements disposed between said tub and said supporting means adapted to resist tilting movement of said tub, means operable to center said shafts and for maintaining the cooperating frictional engagement of said elements, and balancing means connected to and being disposed adjacent the upper end of said tub, 17. In a washing machine, the combination of a rotatable tub adapted to receive liquid and material to be washed, means including shaft means arranged concentrically with respect to the vertical axis of said tub for rotating said tub to extract liquid from the material contained therein, means for supporting said tub for tilting movement about a point adjacent the lower end of said shaft means, means comprising cooperating spherical friction surfaces adapted to resist tilting movement of said tub, flexible means having a component of force acting to center said shaft means and a component of force for maintaining said surfaces in operative frictional engagement, and balancing means connected to and being disposed adjacent the upper end of said tub.

18. In a washing machine, the combination of a rotatable tub adapted to receive liquid and material to be washed, means including shaft means arranged concentrically with respect to the vertical axis of said tub for rotating said tub to extract liquid from the material contained therein, means for supporting said tub for tilting movement about a point adjacent the lower end of said shaft means, means comprising cooperating spherical friction surfaces adapted to resist tilting movement of said tub, flexible means having a component of force acting to center said shaft means and a component of force for maintaining said surfaces in operative frictional engagement, and balancing means connected to and being disposed adjacent the upper end of said tub, said balancing means including a confined body of mobile material.

19. In a washing machine, the combination of a rotatable tub adapted to receive liquid and material to be washed, means including shaft means arranged concentrically with respect to the vertical axis of said tub for rotating said tub to extract liquid from the material contained therein, means for supporting said tub for tilting movement about a point adjacent the lower end of said shaft means, means comprising friction elements having cooperating spherical friction surfaces adapted to resist tilting movement of said tub, one of said elements being resiliently centered with respect to said shaft means and the other of said elements being movable axially relative to said shaft means, flexible means having a component of force acting to center said shaft means and a component of force for maintaining said surfaces in operative frictional engagement, and balancing means connected to and being disposed adjacent the upper end of said tub.

20. In a washing machine, the combination of an outer stationary tub having a centrally disposed sleeve having its lower end portion depending from the bottom wall thereof and its upper end disposed a substantial distance above said bottom wall, an inner tub mounted for rotation within said outer tub adapted to receive liquid and material to be washed, means including shaft means extending through said sleeve for rotating said tub to extract liquid from the material contained therein, means for supporting said tub for tilting movement about a point adjacent the lower end of said shaft means, means comprising friction elements having cooperating spherical friction surfaces adapted to resist tilting movement of said tub, resilient means disposed in abutting relation to said depending sleeve portion and one of said elements for centering the same with respect to said shaft means, the other of said elements being mounted for axial movement with respect to said shaft means, flexible means so connected to said outer tub and said last named element as to provide a component of force acting to center said shaft means and a component of force acting to maintain said surfaces in operative frictional engagement.

21. In a washing machine, the combination of a base, a rotatable tub adapted to receive liquid and material to be washed, a washing device disposed within said tub, inner and outer shafts concentrically arranged with respect to the vertical axis of said tub, means effective upon rotation of said inner shaft in one direction for operating said washing device through said shaft to effect a washing operation within said tub, said outer shaft being connected to said tub for rotation thereof upon rotation of said inner shaft in the reverse direction to extract liquid from the material contained in said tub, means supporting said inner shaft upon said outer shaft, resilient means for tiltably supporting said outer shaft upon said base, means comprising friction elements having cooperating spherical friction surfaces adapted to resist tilting movement of said tub, one of said elements being stationary and the other of said elements being mounted for movement axially with respect to said outer shaft, flexible means connected to said movable element for centering said shafts and for maintaining the cooperating frictional engagement of said elements, a one-way clutch device mounted in said movable element and operable to hold said outer shaft and tub stationary upon rotation of said inner shaft in said first named direction, drive means for said inner shaft, and a one-way clutch device associated with said drive means and operable to effect a driving connection between said drive means and outer shaft upon rotation of said inner shaft in the reverse direction.

22. In a washing machine, the combination of a base, a rotatable tub adapted to receive liquid and material to be washed, a washing device disposed within said tub, inner and outer shafts concentrically arranged with respect to the vertical axis of said tub, means effective upon rotation of said inner shaft in one direction for operating said washing device through said shaft to effect a washing operation within said tub, said outer shaft being connected to said tub for rotation thereof upon rotation of said inner shaft in the reverse direction to extract liquid from the material contained in said tub, means supporting said inner shaft upon said outer shaft, a bearing having shouldered engagement with said outer shaft adjacent its lower end and being resiliently mounted in said base to provide a single tiltable support for said tub, means comprising friction elements having cooperating friction surfaces adapted to resist tilting movement of said tub, one of said elements being stationary and the other of said elements being mounted for movement axially with respect to said outer shaft, flexible means connected to said movable element for centering said shafts and for maintaining the cooperating frictional engagement of said elements, a one-way clutch device mounted in said movable element and operable to hold said outer shaft and tub stationary upon rotation of said inner shaft in said first named direction, drive means for said inner shaft, and a one-way clutch device associated with said drive means and operable to effect a driving connection between said drive means and outer shaft upon rotation of said inner shaft in the reverse direction.

23. In a washing machine, the combination of a base, an outer stationary tub having a centrally disposed sleeve extending upwardly from the bottom wall thereof, an inner tub mounted for rotation within said outer tub adapted to receive liquid and material to be washed, a washing device disposed within said inner tub, inner and outer shafts concentrically arranged with respect to the vertical axis of said tub, means effective upon rotation of said inner shaft in one direction for operating said washing device through said shaft to effect a washing operation within said tub, said outer shaft being connected to said tub for rotation thereof upon rotation of said inner shaft in the reverse direction to extract liquid from the material contained in said tub, means supporting said inner shaft upon said outer shaft, a bearing having shouldered engagement with said outer shaft adjacent its lower end and being resiliently mounted in said base to provide a single tiltable support for said tub, means comprising friction elements having cooperating friction surfaces adapted to resist tilting movement of said tub, one of said elements being positioned centrally of said outer tub at the bottom wall thereof, the other of said elements being mounted for movement axially with respect to said outer shaft, flexible means connected to said movable element and the bottom of said tub for centering said shafts and for maintaining the cooperating frictional engagement of said elements, a one-way clutch device mounted in said movable element and operable to hold said outer shaft and tub stationary upon rotation of said inner shaft in said first named direction, a driven pulley mounted on said inner shaft at its lower end, and a one-way clutch device mounted on said pulley and operable to effect a driving connection between said pulley and said outer shaft upon rotation of said inner shaft in the reverse direction.

24. In a washing machine, the combination of a base, a rotatable tub adapted to receive liquid and material to be washed, a washing device disposed within said tub, inner and outer shafts concentrically arranged with respect to the vertical axis of said tub, means for supporting said inner shaft upon said outer shaft, means effective upon rotation of said inner shaft in one direction for operating said washing device through said shaft to effect a washing operation within said tub, means interposed between said outer shaft and base to provide the sole support for said tub, and means effective upon rotation of said inner shaft in the reverse direction for rotating said tub to extract liquid from the material contained therein.

25. In a washing machine, the combination of a base, a rotatable tub adapted to receive a liquid and material to be washed, a washing device disposed within said tub, inner and outer shafts concentrically arranged with respect to the vertical axis of said tub, means for supporting said inner shaft upon said outer shaft, means effective upon rotation of said inner shaft in one direction for operating said washing device through said shaft to effect a washing operation within said tub, means interposed between said outer shaft and base to provide a single flexible support for tilting movement of said tub, means effective upon rotation of said inner shaft in the reverse direction for rotating said tub to extract liquid from the material contained therein, means comprising cooperating spherical surfaces adapted to resist movement of said tub, and means operable to center said shaft means and for maintaining the cooperating frictional engagement of said elements.

26. In a washing machine, the combination of a base, a rotatable tub adapted to receive liquid and material to be washed, a washing device disposed within said tub, inner and outer shafts concentrically arranged with respect to the vertical axis of said tub, means for supporting said inner shaft upon said outer shaft, means effective upon rotation of said inner shaft in one direction for operating said washing device through said shaft to effect a washing operation within said tub, means interposed between said outer shaft and base to provide a single flexible support for tilting movement of said tub, means effective upon rotation of said inner shaft in the reverse direction for rotating said tub to extract liquid from the material contained therein, means comprising cooperating spherical surfaces adapted to resist movement of said tub, means operable to center said shaft means and for maintaining the cooperating frictional engagement of said elements, and balancing means including a confined body of mobile material connected to and being disposed adjacent the upper end of said tub.

27. In a washing machine, the combination of a rotatable tub having an open end and adapted to receive liquid and material to be washed, means including shaft means for rotating said tub to extract liquid from the material contained therein, means for supporting said tub for tilting movement about a point adjacent the end of said shaft means, friction means disposed between said tub and said supporting means resisting tilting movement of said tub, flexible means for centering said shaft means, and balancing means connected to and being disposed adjacent the open end of said tub, said balancing means including a confined body of mobile material.

28. In a washing machine, the combination of a rotatable tub adapted to receive a liquid and material to be washed, means including shaft means for rotating said tub to extract liquid from the material contained therein, means for supporting said tub for tilting movement about a point adjacent the end of said shaft means, means comprising cooperating spherical friction surfaces disposed between said tub and said supporting means adapted to resist tilting movement of said tub, and flexible means having a component of force acting to center said shaft means and a component of force for maintaining said surfaces in operative frictional engagement.

29. In a washing machine, the combination of an outer stationary tub, a rotatable tub disposed therein and adapted to receive liquid and material to be washed, means including shaft means for rotating said tub to extract liquid from the material contained therein, means for supporting said tub for tilting movement about a point adjacent the end of said shaft means, and stationary tub having a spherical friction surface, means disposed between said supporting means and said stationary tub provided with a spherical friction surface adapted to cooperate with said first named spherical friction surface for resisting tilting movement of said tub, and flexible means having a component of force acting to center said shaft means and a component of force for maintaining said surfaces in operative frictional engagement.

THOMAS R. SMITH.

References Cited in the file of this patent

UNITED STATES PATENTS

| Number | Name | Date |
|---|---|---|
| 1,005,093 | Wilson | Oct. 3, 1911 |
| 1,393,969 | Ritz et al. | Oct. 18, 1921 |
| 1,611,795 | Warner | Dec. 21, 1926 |
| 1,660,427 | Ruiz | Feb. 28, 1928 |
| 1,925,633 | Gulick | Sept. 5, 1733 |
| 1,931,624 | Schwarze | Oct. 24, 1933 |
| 1,962,125 | Burkle | June 12, 1934 |
| 2,034,244 | Mikulasek | Mar. 17, 1936 |
| 2,048,510 | Morril | July 21, 1936 |
| 2,106,986 | Pearce | Feb. 1, 1938 |
| 2,119,254 | Whiteley | May 31, 1938 |
| 2,303,940 | Kuhn | Dec. 1, 1942 |
| 2,346,669 | Dunham | Apr. 18, 1944 |
| 2,350,108 | Geldhof et al. | May 30, 1944 |
| 2,361,767 | Hays | Oct. 31, 1944 |
| 2,381,545 | Kirby | Aug. 7, 1945 |
| 2,387,823 | Berry | Oct. 30, 1945 |
| 2,389,774 | Haberstrump | Nov. 27, 1945 |
| 2,397,268 | Jorgenson et al. | Mar. 26, 1946 |
| 2,428,573 | Loeb | Oct. 7, 1947 |
| 2,434,199 | Dyer | Jan. 6, 1948 |
| 2,439,215 | Lund | Apr. 6, 1948 |
| 2,455,043 | Calhoun | Nov. 30, 1948 |
| 2,478,188 | Gibson | Aug. 9, 1949 |
| 2,516,656 | Smith | July 25, 1950 |
| 2,534,194 | Emmert | Dec. 12, 1950 |

FOREIGN PATENTS

| Number | Country | Date |
|---|---|---|
| 522,047 | Germany | Mar. 30, 1931 |